(12) United States Patent
Osotio et al.

(10) Patent No.: US 10,719,193 B2
(45) Date of Patent: Jul. 21, 2020

(54) AUGMENTING SEARCH WITH THREE-DIMENSIONAL REPRESENTATIONS

(71) Applicant: MICROSOFT TECHNOLOGY LICENSING, LLC, Redmond, WA (US)

(72) Inventors: Neal Osotio, Sammamish, WA (US); Roberto Morales, Shoreline, WA (US); YoungSun Park, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 329 days.

(21) Appl. No.: 15/134,021

(22) Filed: Apr. 20, 2016

(65) Prior Publication Data

US 2017/0308264 A1     Oct. 26, 2017

(51) Int. Cl.
*G06F 3/0481* (2013.01)
*G06F 16/248* (2019.01)
*G06F 16/438* (2019.01)
*G06F 16/58* (2019.01)
*G06F 40/134* (2020.01)
(Continued)

(52) U.S. Cl.
CPC ......... *G06F 3/04815* (2013.01); *G06F 3/013* (2013.01); *G06F 3/017* (2013.01); *G06F 3/0482* (2013.01); *G06F 16/248* (2019.01); *G06F 16/438* (2019.01); *G06F 16/5866* (2019.01); *G06F 40/134* (2020.01); *G06T 15/00* (2013.01); *G06T 19/006* (2013.01); *H04L 67/306* (2013.01)

(58) Field of Classification Search
CPC ...... G06F 3/04815; G06F 3/013; G06F 3/017; G06F 3/0482; G06F 17/2235; G06F 17/30554; G06T 15/00; G06T 19/006; H04L 67/306
See application file for complete search history.

(56) References Cited

U.S. PATENT DOCUMENTS 6,363,404 B1 * 3/2002 Dalal ................ G06F 17/30905
345/582
6,833,828 B1 * 12/2004 Wininger ............ G06F 3/04815
345/419
(Continued)

FOREIGN PATENT DOCUMENTS

WO      2013023705 A1    2/2013

OTHER PUBLICATIONS

Pascoal, Pedro B., "Im-ORet: Immersive Object Retrieval", in Proceedings of IEEE Virtual Reality Short Papers and Posters, Mar. 4, 2012, 11 pages.
(Continued)

*Primary Examiner* — Jung-Mu T Chuang
(74) *Attorney, Agent, or Firm* — Shook, Hardy & Bacon, L.L.P.

(57) ABSTRACT

Systems, methods and computer storage media for providing three-dimensional content within search are provided. In particular, three-dimensional content is provided in combination with two-dimensional search results in response to a search query. The three-dimensional content is rendered such that it can be interacted with by a user. User interactions with either the three-dimensional content or the two-dimensional search results cause updated three-dimensional content and/or two-dimensional search results to be rendered.

19 Claims, 10 Drawing Sheets

(51) Int. Cl.

| | | |
|---|---|---|
| *G06F 3/01* | (2006.01) | |
| *G06F 3/0482* | (2013.01) | |
| *G06T 15/00* | (2011.01) | |
| *G06T 19/00* | (2011.01) | |
| *H04L 29/08* | (2006.01) | |

(56) References Cited

U.S. PATENT DOCUMENTS

| | | | | |
|---|---|---|---|---|
| 7,079,142 | B2* | 7/2006 | Chiu | G06T 11/206 345/440 |
| 8,314,790 | B1* | 11/2012 | Zeiger | G06T 13/00 345/419 |
| 8,497,859 | B1* | 7/2013 | Hickman | G06T 19/00 345/419 |
| 8,533,187 | B2* | 9/2013 | Brewington | G06F 16/9537 707/723 |
| 8,682,879 | B2* | 3/2014 | Kim | G09G 5/377 235/462.01 |
| 8,686,943 | B1* | 4/2014 | Rafii | G06F 3/017 345/158 |
| 8,704,879 | B1* | 4/2014 | Cheng | G06F 3/013 348/51 |
| 8,860,717 | B1* | 10/2014 | Zeiger | G06T 13/00 345/419 |
| 9,282,321 | B2* | 3/2016 | Sandrew | G06T 15/205 |
| 9,414,115 | B1* | 8/2016 | Mao | H04N 21/44218 |
| 9,465,990 | B2* | 10/2016 | Ronnecke | A61B 3/113 |
| 9,489,457 | B2* | 11/2016 | Regan | G06F 9/445 |
| 9,552,671 | B2* | 1/2017 | Park | G06F 3/04815 |
| 9,594,489 | B2* | 3/2017 | Niranjani | G06F 3/0488 |
| 9,652,893 | B2* | 5/2017 | Michail | G06T 19/006 |
| 9,785,652 | B2* | 10/2017 | Flynn | G06F 17/30259 |
| 9,851,788 | B2* | 12/2017 | Kim | G02B 27/017 |
| 9,851,793 | B1* | 12/2017 | van Hoff | G06F 3/013 |
| 10,055,191 | B2* | 8/2018 | Vennstrom | G06F 3/165 |
| 2003/0164827 | A1* | 9/2003 | Gottesman | G06T 15/20 345/419 |
| 2004/0249809 | A1* | 12/2004 | Ramani | G06F 17/30259 |
| 2005/0002571 | A1* | 1/2005 | Hiraga | G06K 9/00201 382/218 |
| 2005/0168460 | A1* | 8/2005 | Razdan | G06F 17/30398 345/419 |
| 2006/0038881 | A1* | 2/2006 | Starkweather | H04N 13/371 348/51 |
| 2006/0190312 | A1* | 8/2006 | Onuma | G06F 30/00 |
| 2007/0070066 | A1* | 3/2007 | Bakhash | G06F 3/04815 345/419 |
| 2007/0130112 | A1* | 6/2007 | Lin | G06F 17/3002 |
| 2008/0003554 | A1* | 1/2008 | Macri | G09B 5/00 434/257 |
| 2008/0065615 | A1* | 3/2008 | Bober | G06F 17/30259 |
| 2009/0113349 | A1* | 4/2009 | Zohar | G06Q 30/00 715/852 |
| 2009/0265604 | A1* | 10/2009 | Howard | G06Q 10/10 715/205 |
| 2010/0134601 | A1 | 6/2010 | Lefevre et al. | |
| 2011/0061011 | A1* | 3/2011 | Hoguet | G06F 3/0482 715/769 |
| 2011/0128555 | A1* | 6/2011 | Rotschild | G02B 27/2271 356/625 |
| 2011/0166677 | A1* | 7/2011 | Bromley | G05B 19/409 700/83 |
| 2011/0169927 | A1* | 7/2011 | Mages | G06F 3/04815 348/51 |
| 2011/0258175 | A1* | 10/2011 | Kim | G06F 17/30864 707/709 |
| 2012/0158497 | A1* | 6/2012 | Knighton | G06Q 30/0251 705/14.49 |
| 2012/0166431 | A1* | 6/2012 | Brewington | G06F 16/9537 707/724 |
| 2013/0018867 | A1* | 1/2013 | Regan | G06F 9/445 707/707 |
| 2013/0097197 | A1* | 4/2013 | Rincover | G01C 21/3614 707/766 |
| 2013/0151339 | A1 | 6/2013 | Kim et al. | |
| 2013/0155048 | A1* | 6/2013 | Swamy | G06T 15/005 345/419 |
| 2013/0178287 | A1* | 7/2013 | Yahav | G02B 27/01 463/32 |
| 2013/0246383 | A1* | 9/2013 | White | G06F 16/9535 707/706 |
| 2013/0278631 | A1* | 10/2013 | Border | G02B 27/017 345/633 |
| 2013/0286168 | A1* | 10/2013 | Park | G09G 3/003 348/54 |
| 2013/0311887 | A1* | 11/2013 | Nankani | G06F 3/04815 715/730 |
| 2014/0037218 | A1* | 2/2014 | Zweig | G06F 16/5866 382/218 |
| 2014/0129990 | A1* | 5/2014 | Xin | G06F 3/017 715/849 |
| 2014/0168056 | A1* | 6/2014 | Swaminathan | G06F 3/013 345/156 |
| 2014/0181208 | A1* | 6/2014 | Robinson | G06F 17/30867 709/204 |
| 2014/0282220 | A1* | 9/2014 | Wantland | G06F 3/04845 715/782 |
| 2014/0282646 | A1* | 9/2014 | McCoy | G06K 9/00597 725/12 |
| 2014/0310256 | A1* | 10/2014 | Olsson | G06F 3/013 707/706 |
| 2014/0361984 | A1* | 12/2014 | Kim | G06F 3/013 345/156 |
| 2015/0220768 | A1* | 8/2015 | Ronnecke | A61B 3/113 348/78 |
| 2015/0302426 | A1* | 10/2015 | Rogers | G06Q 30/0201 705/7.29 |
| 2015/0310665 | A1* | 10/2015 | Michail | G06T 19/006 345/419 |
| 2015/0358613 | A1* | 12/2015 | Sandrew | G06T 15/205 348/36 |
| 2016/0012160 | A1* | 1/2016 | Mohacsi | G06F 17/5004 703/1 |
| 2016/0027209 | A1* | 1/2016 | Demirli | G06F 3/015 345/419 |
| 2016/0034150 | A1* | 2/2016 | Behr | G06F 3/04845 715/771 |
| 2016/0037236 | A1* | 2/2016 | Newell | H04N 21/4316 725/34 |
| 2016/0048304 | A1* | 2/2016 | Niranjani | G06F 3/0488 715/800 |
| 2016/0055236 | A1* | 2/2016 | Frank | G06F 17/30702 707/748 |
| 2016/0093108 | A1* | 3/2016 | Mao | A63F 13/42 345/633 |
| 2016/0132289 | A1* | 5/2016 | Vennstrom | G06F 3/167 700/94 |
| 2016/0140189 | A1* | 5/2016 | Amitai | G06F 3/0482 707/722 |
| 2016/0278427 | A1* | 9/2016 | Davila | A23P 1/086 |
| 2016/0279516 | A1* | 9/2016 | Gupta | A63F 13/5255 |
| 2016/0298969 | A1* | 10/2016 | Glenn, III | G01C 21/206 |
| 2016/0299661 | A1* | 10/2016 | Alpert | H04L 67/18 |
| 2016/0321302 | A1* | 11/2016 | Flynn | G06F 17/30259 |
| 2017/0039287 | A1* | 2/2017 | Lau | G06F 17/30867 |
| 2017/0230454 | A1* | 8/2017 | Ferrer | H04N 21/25891 |
| 2017/0270636 | A1* | 9/2017 | Shtukater | G06T 3/20 |
| 2017/0307889 | A1* | 10/2017 | Newman | G02B 27/0172 |
| 2017/0308264 | A1* | 10/2017 | Osotio | G06F 3/04815 |
| 2017/0344223 | A1* | 11/2017 | Holzer | G06F 3/04815 |
| 2017/0345218 | A1* | 11/2017 | Bedikian | G09G 5/14 |

OTHER PUBLICATIONS

Aggarwal, Vineet, "How to Create an Augmented Reality App", Published on: Aug. 18, 2014 Available at: http://www.3pillarglobal.com/insights/how-to-create-an-augmented-reality-app.

(56) References Cited

OTHER PUBLICATIONS

Alsada, et al., "Parallel Web Browsing in Tangible Augmented Reality Environments", in Proceedings of the 33rd Annual ACM Conference Extended Abstracts on Human Factors in Computing Systems, Apr. 18, 2015, pp. 953-958.
"3Diva", Retrieved on: Jan. 15, 2016 Available at: http://www.3dvia.com/studio/documentation/user-manual/video/live-video.
"Hands on Search—Yahoo Japan", Retrieved on: Jan. 15, 2016 Available at: http://award.aid-dcc.com/yahoo/en/.
Mitra, Ambarish, "Augmented Reality's Next Frontier is Real-World Search", Published on: Jun. 17, 2014 Available at: http://www.wired.com/2014/06/well-soon-be-researching-3-d-objects-just-by-looking-at-them/.
Brokaw, Alex, "How a Virtual Reality App Could Change the Way We Search the Web", Published on: Oct. 1, 2015 Available at: http://uploadvr.com/how-a-virtual-reality-app-could-change-the-way-we-search-the-web/.
"Matterport Brings 3D Capture to Mobile", Published on: Jul. 18, 2014 Available at: http://matterport.com/matterport-and-google-atap-project-tango/.
Park, et al., "Learning to Produce 3D Media from a Captured 2D Video", in Journal of Latex Class Files, vol. 6, Issue 1, Jan. 2007, pp. 1-11.
"International Search Report and Written Opinion Issued in PCT Application No. PCT/US/2017027283", dated Aug. 4, 2017, 11 Pages.

\* cited by examiner

AUGMENTING SEARCH WITH THREE-DIMENSIONAL REPRESENTATIONS

BACKGROUND

Presently, much of the information accessible on the Internet, for instance, search-related information collected and maintained by companies such as Microsoft® Corporation, Google® Inc. and Facebook®, Inc., is viewable primarily in two dimensions. This is because current technology accessible to users to view information (e.g., desktop computers, mobile devices, consoles, and the like) primarily renders the information in two dimensions. More recently, products (e.g., virtual reality products) that are capable of rendering data in three dimensions have been introduced to the consumer market.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the technology described herein facilitate providing three-dimensional (3-D) representations in combination with search results. The search results are typically two-dimensional (2-D). In one embodiment, a determination of whether to render 3-D representations/content with search results is made. Not all situations are appropriate for 3-D rendering so this evaluation provides the necessary control such that 3-D representations are not inappropriately provided and, thus, hinder a user's experience. Whether to render 3-D content is determined, in some aspects, based on context of a user query, as will be discussed in detail below. Other factors, such as a user's intent, may also be used to determine the appropriateness of providing 3-D content. Based on a determination that it is appropriate to render 3-D content in response to a search query, the 3-D content is provided for simultaneous display with the 2-D search results.

BRIEF DESCRIPTION OF THE DRAWINGS

The present technology is illustrated by way of example and not limitation in the accompanying figures in which like reference numerals indicate similar elements and in which.

DETAILED DESCRIPTION

Figure 1:
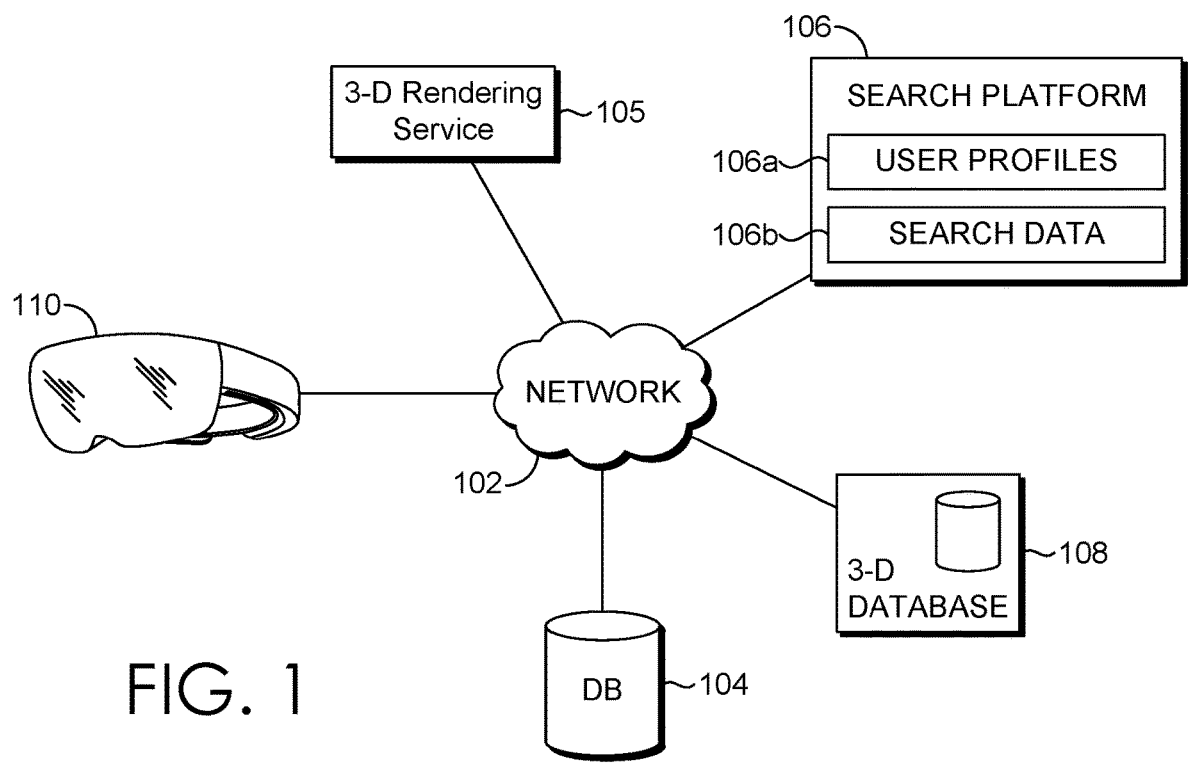
FIG. 1 is a diagram depicting an exemplary computing environment suitable for implementing aspects of the technology described herein.

The technology of the present application is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein allow for the providing of 3-D content/representations in combination with 2-D search results. The 3-D content and 2-D search results may be simultaneously displayed. Measures are established that control the presentation of 3-D content such that the 3-D content is only provided for display with search results when appropriate. Appropriateness is measured based on a variety of factors including, but not limited to, user intent, context of a search query, and the like. When appropriate, 3-D content may be provided for simultaneous display with search results such that the user can interact with the 3-D content while simultaneously being provided with search results responsive to an input search query. The ability to combine information (such as search-related information) with the three-dimensional capabilities of this viewing technology such that the information may be viewed and manipulated in three-dimensions is currently lacking.

The present invention advances machine learning to allow for structured 3-D model to be rendered based on current data stored in a search platform (e.g., Bing) and understanding dimensional calculations to create. Thus, search platforms can, using this technology, include a 3-D database of objects. This incorporation was not previously possible due to a lack of 3-D data linked with search platforms and a lack of understanding of dimensional calculations within search. The present invention utilizes necessary technology in both software and hardware to provide the tools to determine when it is appropriate to render 3-D models in search and how to render the 3-D model within search using the 3-D data that is part of the search platform.

As such, utilizing embodiments herein, 3-D content may be provided for presentation with search results responsive to a search query. Initially, a determination of whether 3-D content is present is made. Simply put, if no 3-D content is present for a search query, it is not necessary to provide 3-D content with the search results. If 3-D content is present, appropriateness of providing the 3-D content is measured.

A "3-D representation," (or 3-D content) as the term is utilized herein, refers to an electronic rendering that approximates an actual or imagined real world object in a plurality of qualities (e.g., shape, color, dimension, proportion, and the like) that make the representation visually appear like an image of a real world object (e.g., a 3-D model). A "2-D representation" or content, as used herein, refers generally to any representation in two-dimensions (for instance, a sketch, drawing or photograph). Such 2-D representations include text-based search results. In exemplary embodiments, a hologram (i.e., an object representation that is produced by a split laser beam and that appears to be three-dimensional) representing an object may be provided in combination with search results.

As previously mentioned, appropriateness of providing 3-D content may be based on context of a search query. Context may be determined using, at least one of, a user profile, social media data for the user, a user's previous search query history, and the like. Context may also be determined based on user intent. User intent may be identified based on search query content, search query session duration, a quantity of repeat search queries, previous search queries by the user or by many users, related search queries, data items saved by the user, data items posted by the user, data items shared by the user, web sites or web pages visited by the user, a quantity of visits to certain web sites or web pages by the user, an amount of time the user lingers on a particular web site or web page, an amount of time the user lingers on a particular item (determined, for instance, using head and/or eye-tracking technology), user-stated preferences, user-inferred preferences, and prior user behavior. In embodiments, the above-described information is determined by mining search-related information, for instance, search-related information collected and maintained by companies such as Microsoft® Corporation, Google® Inc., and Facebook®, Inc. Data mining techniques are known to those having ordinary skill in the art and, accordingly, are not further described herein.

Once 3-D representations are deemed available and appropriate, they can be provided for presentation with search results. Once provided, users can interact with the 3-D representations and 3-D representations, the search results, or both, may be updated based on the user interactions.

According to a first aspect herein, a method of providing 3-D content within search is provided. The method comprises, receiving an indication of a search query input of a user and identifying 3-D content associated with the search query input. The method further comprises determining whether to render the 3-D content with one or more 2-D search results associated with the search query input based on a context of the search query input. Further, the method includes based on a determination to render the three-dimensional content with the one or more search results, providing the 3-D content to be rendered with the one or more 2-D search results associated with the search query input.

According to a second aspect herein, a system is provided for providing 3-D content within search. The system comprises one or more processors and computer storage memory having computer-executable instructions embodied thereon that, when executed by the one or more processors, implement a method for providing three-dimensional content within search, the method comprising: providing at least one 3-D representation in combination with one or more 2-D search results in response to a search query input from a user, wherein the at least one 3-D representation and the one or more 2-D search results are provided on a same interface; receiving an indication of a user interaction with the at least one 3-D representation; based on the user interaction, refining the one or more 2-D search results to create an updated 2-D search result listing including at least one new result; and providing the updated 2-D search result listing with the at least one 3-D representation for simultaneous display.

According to a third aspect herein, one or more computer storage hardware devices having computer-executable instructions embodied thereon, that when executed, facilitate a method of providing three-dimensional content within search is provided. The method comprises: providing at least one 3-D representation in combination with one or more 2-D search results in response to a search query input from a user, wherein the at least one 3-D representation and the one or more 2-D search results are provided on a same interface; receiving an indication of a user interaction with the at least one 3-D representation; based on the user interaction, refining the one or more 2-D search results to create an updated 2-D search result listing including at least one new result; and providing the updated 2-D search result listing with the at least one 3-D representation for simultaneous display.

Having briefly described an overview of aspects of the technology described herein, an exemplary operating environment suitable for use in implementing the technology is described below.

Turning now to FIG. 1, a block diagram is provided showing an exemplary operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a network 102, a database 104, a search platform 106, a 3-D database 108, and a user device 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 102, which may include, without limitation, one or more local area networks (LANs) and/or wide area networks (WANs). In exemplary implementations, network 102 comprises the Internet and/or a cellular network, amongst any of a variety of possible public and/or private networks.

User device 110 may be user devices on the client-side of operating environment 100, while the other components illustrated in FIG. 1 can be on the server-side of the operating environment 100. The user device 110 is provided as an exemplary device and many devices may be included. User device 110 is shown alone simply for brevity. The user device 110 may be any type of computing device capable of use by a user. For example, in one aspect, user device 110 may be the type of computing device 110 described in relation to FIG. 11. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device. In embodiments, the user device 110 is a virtual reality headset. Any device capable of providing 3-D content may be utilized, though. In exemplary embodiments, the user device 110 includes Hololens® technology, offered by Microsoft® Corporation of Redmond, Wash., Oculus VR® technology, offered by Samsung Electronics®, or other virtual-reality technology.

The search platform 106 may be any search platform capable of providing search results responsive to a query. The search platform 106 may include information commonly collected and maintained by search platforms. Exemplary search platform 106 includes, without limitation, a user profile portion 106a and a search data portion 106b. This information may be utilized in conjunction with any additional information relevant to search from, for example, additional databases such as database 104. Additionally, the search platform 106 may coordinate with, or have included therein, the 3-D database 108, which includes 3-D representations. The 3-D database 108 or the search platform 106, or both, may include mappings that map 3-D representations to relevant search queries. Any other information relevant to search queries, 3-D representations, etc., may be stored in the database 104 or the 3-D database 108. Such information may include, by way of example only, information accessible via the Internet, information locally stored on a computing device associated with the user, information stored in a data store accessible by the user's computing device, and the like.

In embodiments, the database 104 and/or the 3-D database 108 is configured to be searchable for one or more of the items of information stored in association therewith. It will be understood and appreciated by those having ordinary skill in the art that the information stored in association with the database 104 and/or the 3-D database 108 may be configurable and may include any information relevant to, by way of example only, the user and/or the user's activities, data items that may be determined relevant to user intents and 3-D representations, existing 3-D representations, user preferences, and the like. The content and volume of such information are not intended to limit the scope of aspects of the present technology in any way. Further, the database 104 and/or the 3-D database 108 may be a single, independent component (as shown) or a plurality of storage devices, for instance a database cluster, portions of which may reside in association with the 3-D rendering service 105 or the search platform 106, another external computing device (not shown), and/or any combination thereof. Additionally, the database 104 and/or the 3-D database 108 may include a plurality of unrelated data stores within the scope of embodiments of the present technology.

The 3-D rendering service 105 is able to ascertain an appropriateness of 3-D rendering with search results using various information. In embodiments, the 3-D rendering service 105 is integrated into the search platform 106. This application/service 105 may use a 3-D-to-query mapping, search data, user data, or the like to ascertain appropriateness. Initially, the 3-D rendering service 105 identifies whether 3-D content for a query is available. This may be by querying the 3-D database 108 for relevant 3-D representations or for a mapping of the query to 3-D representations. If no 3-D content is present or mapped to the query, no 3-D content is rendered. For example, a search query of a name (e.g., Dan Rather) would not be associated with a 3-D representation. Typically, 3-D representations are provided for real-world objects (e.g., a tangible, physical, real-world item). While the term 3-D representations it used herein, this term includes holograms and encompasses embodiments where holograms of objects are provided.

Once the 3-D rendering service 105 determines that 3-D content is available for the query, an appropriateness evaluation is conducted. Appropriateness, as previously mentioned, may be determined using user intent or user context. User context may be identified from, for example, a user profile (such as user profile 106a), a user's search history (found, for example, in database 104 or the search platform 106), social media data, a company database (e.g., enterprise data), and the like. The 3-D rendering service 105 may identify that 3-D rendering is appropriate upon identifying that a virtual reality headset is being used.

The 3-D rendering service 105 may also work with the search platform 106 to identify when 3-D rendering is appropriate. The search platform 106 may intelligently know that 3-D rendering is appropriate using various machine learning techniques to identify various criteria utilized with a user's intent, a context, and the like to determine appropriateness. For example, the search platform 106 may be able to identify a user's intent in a moment in time that can be used with a context to identify appropriateness. For instance, the user may be in browse mode, purchase mode, gaming mode, research mode, etc., based on user activities within the search platform 106 (e.g., in the search engine). While 3-D rendering may be appropriate for each of the above-listed moments in time, the 3-D rendering may be customized for each. For instance, a user in purchase mode may be provided with a 3-D rendering as well as links within the 3-D rendering to purchase the item shown in the 3-D model.

Customization of 3-D renderings is another feature of the 3-D rendering service 105. The renderings may be customized in the way they are presented, how they are presented, etc. The customizations may be based on, as mentioned above, moments in time, context, intent, etc. For example, as previously explained, purchase customizations may be provided in a 3-D representation for a user in purchase mode. Additional customizations may include, but are not limited to, website redirects, comparison options, 3D print commands, and the like. A user may, for instance, have searched several different types of running shoes such that the 3-D rendering service 105 and/or the search platform 106 knows to provide a comparison feature in the 3-D representation so that several of the items can be compared with one another directly from a 3-D representation. The comparison may include several 3-D representations provided together or may include a redirect to a text-based comparison.

The customizations may also be based on interactions with the 3-D representation. User interactions may include, but are not limited to, a gaze, a natural user interface (NUI) process, and the like. NUI inputs are discussed in detail below but generally include air gestures, voice, or other physiological inputs generated by a user and processed by the NUI. For example, a user can interact with or move a 3-D representation and the 3-D representation will be updated and/or customized based on the interaction.

Gaze may be monitored using eye tracking techniques presently known. For example, eye tracking may identify if a user is reading closely, skimming, scanning, and the like. Eye tracking may also identify a linger time a user spends on at least a portion of 3-D representations, text, etc. By way of example only, the 3-D rendering service 105 can identify when a user's gaze lingers on at least a portion of a 3-D representation (e.g., a user's gaze lingers on a keyboard of a laptop). As a result, the 3-D representation may be automatically adjusted/customized such that the keyboard portion of the 3-D representation is focused on, enlarged, brought closer to the user, etc.

Additionally, when the interactions ends (e.g., the user is no longer directing a gaze to a particular portion of a 3-D rendering), the customization ends. For example, a user may hover/linger over a particular word in a search result listing (or over a portion of a 3-D representation) but then move on. While the user was lingering over the word, a 3-D rendering may be provided associated with the word (e.g., hover over Civic and a 3-D representation of a Civic sedan is provided). When the user moves on (e.g., to continue reading) the 3-D representation is removed/disappears. This feature may be controlled by an on/off option for users such that when 'on' the 3-D rendering service 105 automatically updates/removes 3-D representation(s) as appropriate. In alternative embodiments, the 3-D rendering service 105 or the search platform 106, or both, identifies patterns of users and learns when to update versus when not to update. For instance, users will establish patterns for lingering when an update is desired (e.g., staring at one point for a time period) and patterns for when a user is examining something but does not wish to update either the search results and/or the 3-D representation(s) (e.g., staring at one point but quickly moving on to another). This provides for 3-D representation(s) to be provided based on the content of search results.

Said interactions, in addition to customization of a 3-D representation, may also result in refinement/update of a search query. A user interaction may be identified (by, for instance, the 3-D rendering service 105) and an updated search query may be issued. For example, an initial query may be issued for "four door sedans" but, during review of the initial results (including 3-D representations), the 3-D rendering service 105 identifies that a user's gaze lingers on Civic greater than a predetermined period of time (or more than other results). At that point, an updated search query for "Civic" may be issued. During updated, the search results are continuously updating and the 3-D representation(s) may remain while the search results are updated. The 3-D representation(s) may be updated when the user begins interacting with the updated search results. Alternatively, the 3-D representations(s) may also be updated with the new query.

This concept of pairing search results and 3-D representation(s) also provides monetization opportunities. For instance, additional content related to the content of the search results may be provided with 3-D representation(s). Assume a user lingers over a word "brakes" in a search result listing, the provided 3-D representation(s) that correspond with the word "brakes" may include additional content associated with a particular brand of brakes.

The 3-D rendering service 105 and/or the search platform 106 are also configured to provide the search results and the 3-D representation(s) to the user device 110 for rendering associated therewith. Means for presenting (visually and otherwise) are known to those having ordinary skill in the art and, accordingly, are not further described herein.

Figure 2:
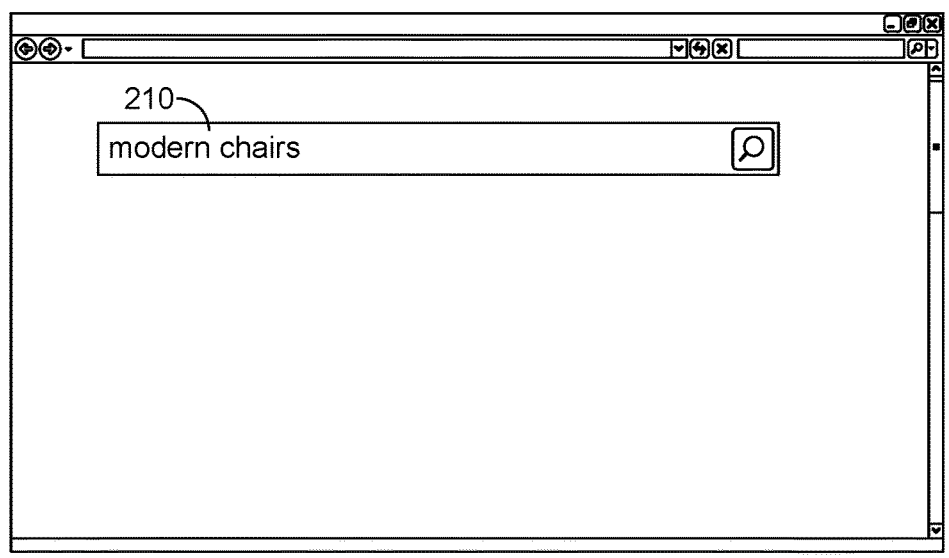
FIG. 2 is an exemplary interface for providing 3-D content, in accordance with an aspect of the technology described herein.
Figure 3:
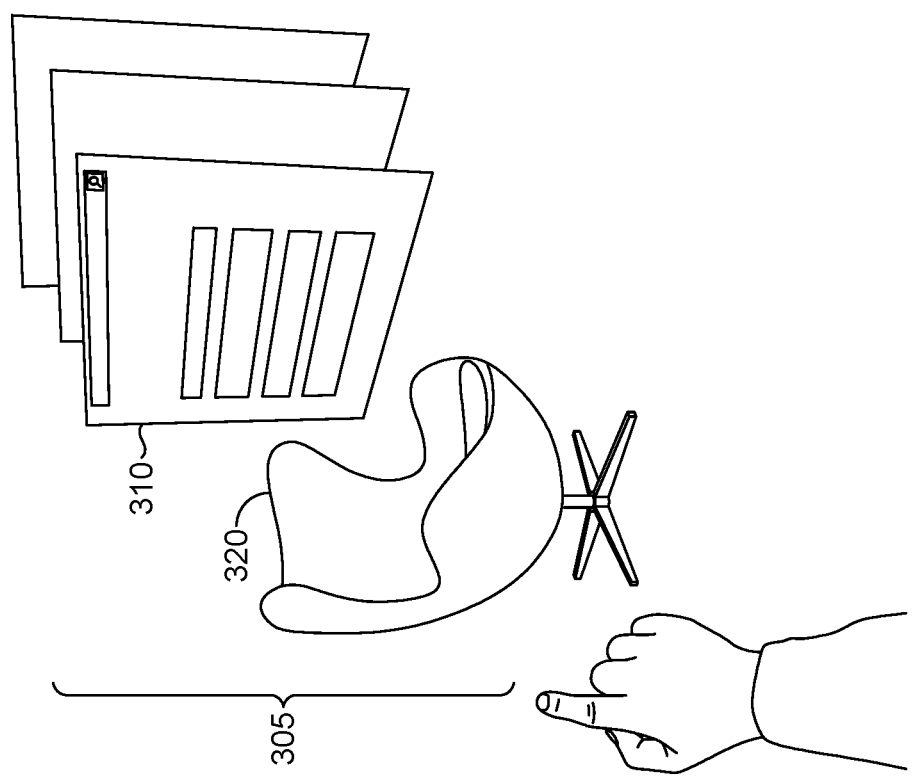
FIG. 3 is an exemplary interface for providing 3-D content with 2-D search results, in accordance with an aspect of the technology described herein.
Figure 3:
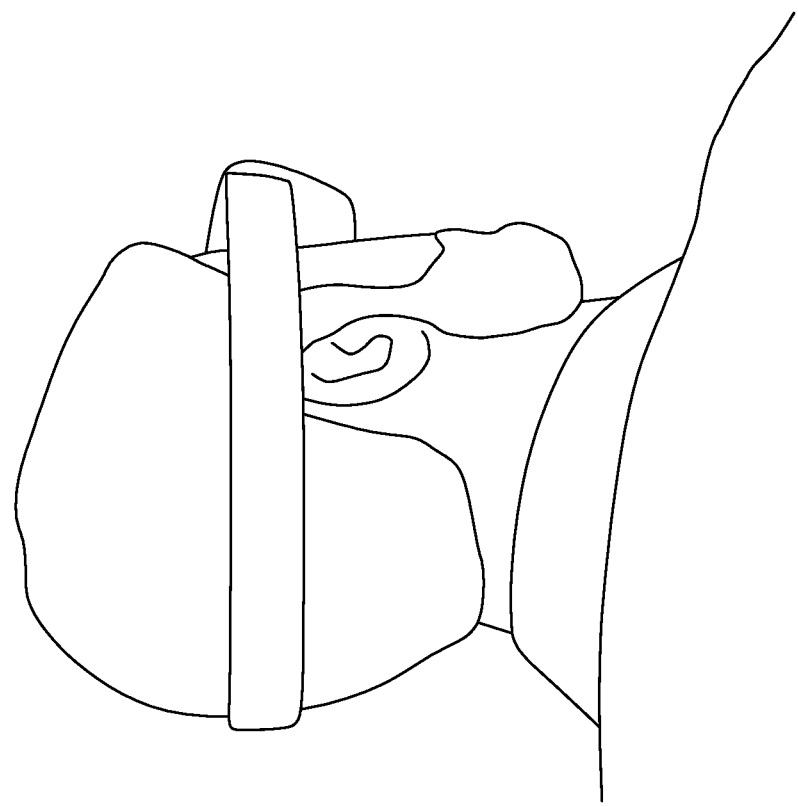

Turning now to FIG. 2, an exemplary interface is provided. Here, a user has input a search query 210 into a search query input area. This issues a search and results is display of FIG. 3 providing an exemplary interface comprising a results area 305 that includes one or more search results 310. The one or more search results 310 are 2-D search results and may be typical text-based search results that one would expect to see from a typical search engine. The results area 305 also includes at least one 3-D representation 320. Here, a user has issued a search for "modern chairs" (as shown in FIG. 2) and one or more search results 310 and a 3-D representation 320 of a modern chair based on the search results 310 are provided. Both the 2-D search results 310 and the 3-D models are provided in response to the search query in a single interface. While only one 3-D representation is illustrated in FIG. 3, it is within the scope of the invention for more than one 3-D representation to be provided with the 2-D search results.

Figure 4:
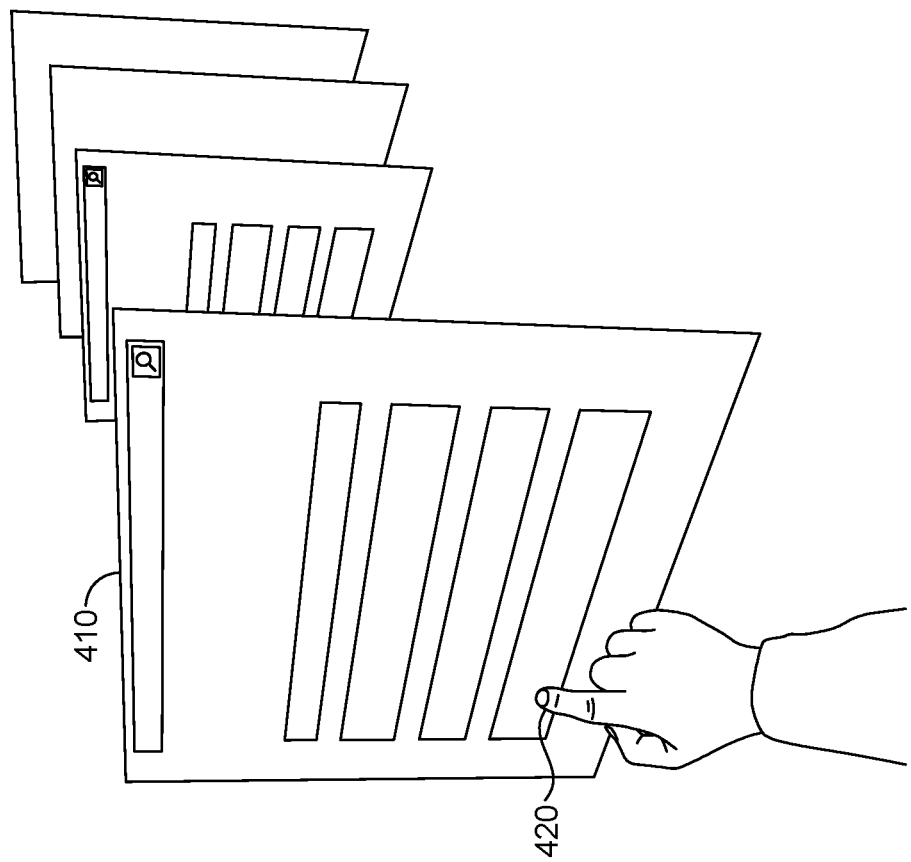
FIG. 4 is an exemplary interface for providing 3-D content, in accordance with an aspect of the technology described herein.
Figure 4:
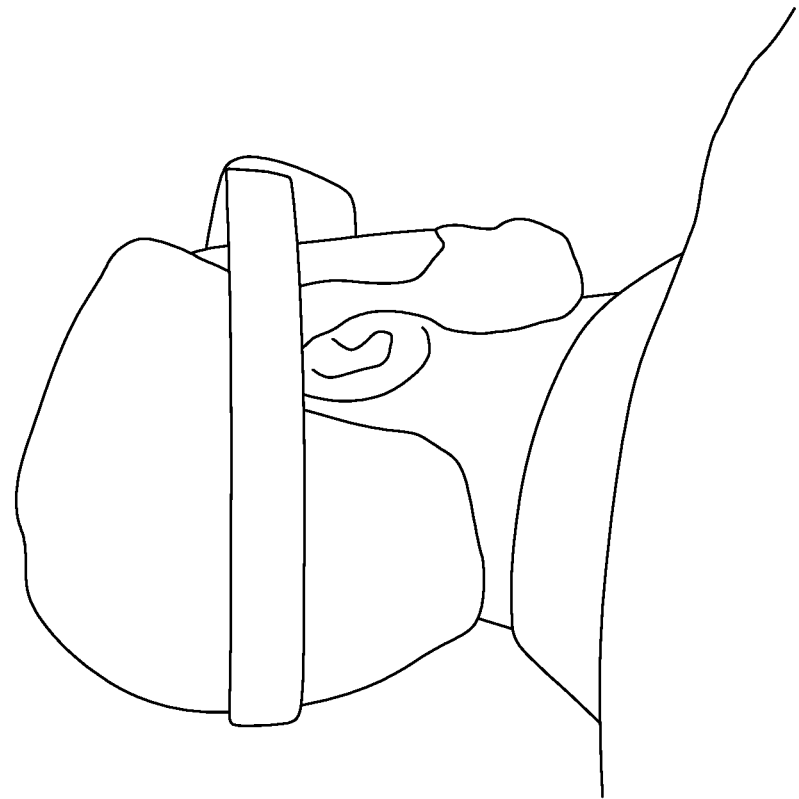

FIG. 4 provides an exemplary interface illustrating a user that has interacted with the 2-D search results 410 to bring the 2-D search results 410 closer to himself. As shown in FIG. 4, the user is interacting with the results, as illustrated by the interaction 420 where the user is selecting a search result from the 2-D search results. In this particular interface, the 3-D model has disappeared when the user began interacting with the 2-D search results 410. However, the 3-D model may remain within the interface and be relocated to a distant position such that the user can fully interact with the 2-D search results 410 as desired.

Figure 5:
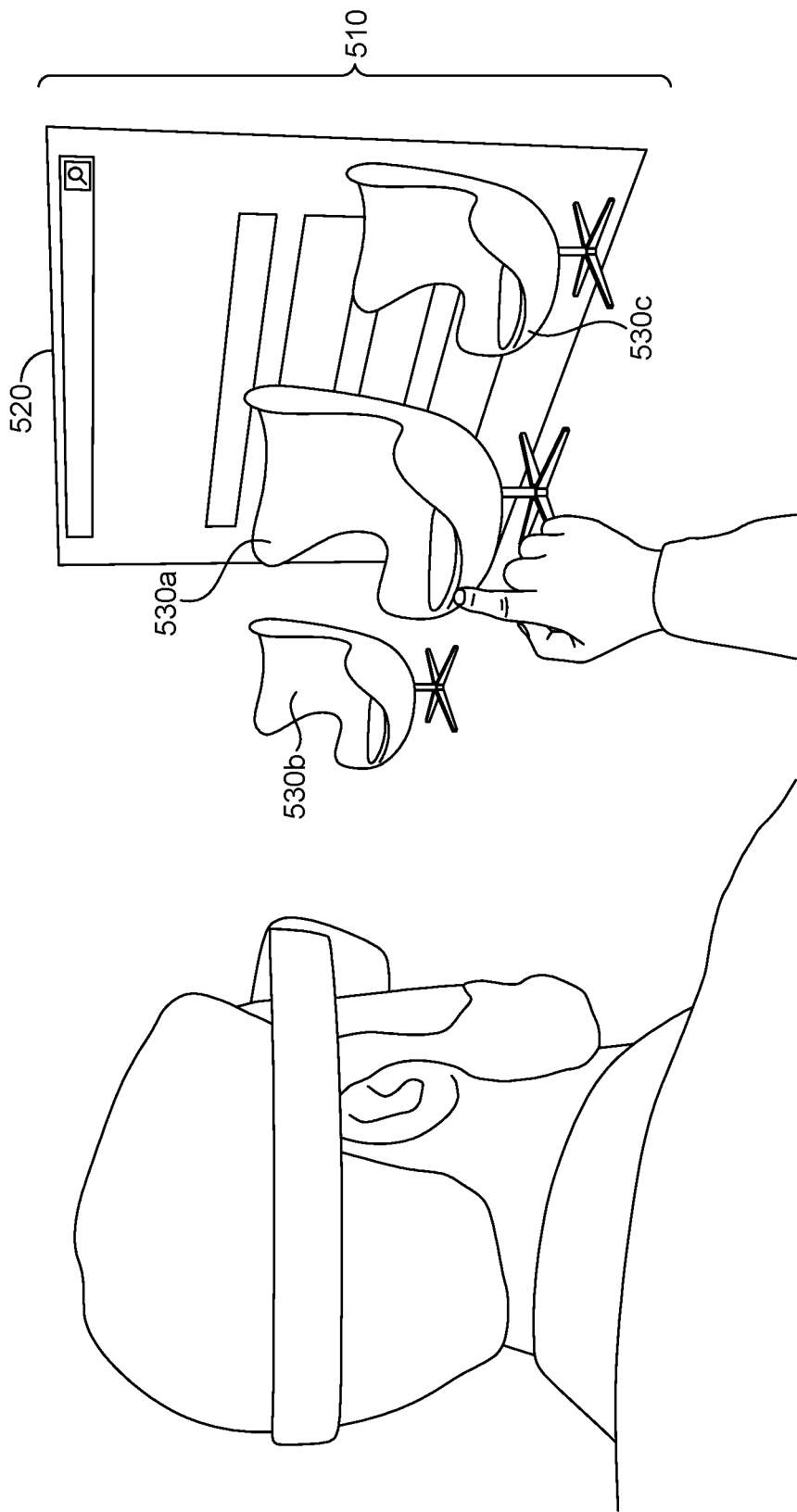
FIG. 5 is an exemplary interface for providing 3-D content with 2-D search results, in accordance with an aspect of the technology described herein.

Upon identifying the interaction 420 shown in FIG. 4, the interface is updated to an updated interface shown in FIG. 5. FIG. 5 includes an updated interface 510 including at least one updated 2-D search result 520 (shown as an entire search results page here) and at least one 3-D representation related to the at least one updated 2-D search result 520. The at least one 3-D representation is illustrated in updated interface 510 by model 530a, model 530b, and model 530c. As is clearly shown by the illustrations thus far, the user is able to interact with both results (i.e., both the 2-D search results and the 3-D representation(s)).

Figure 6:
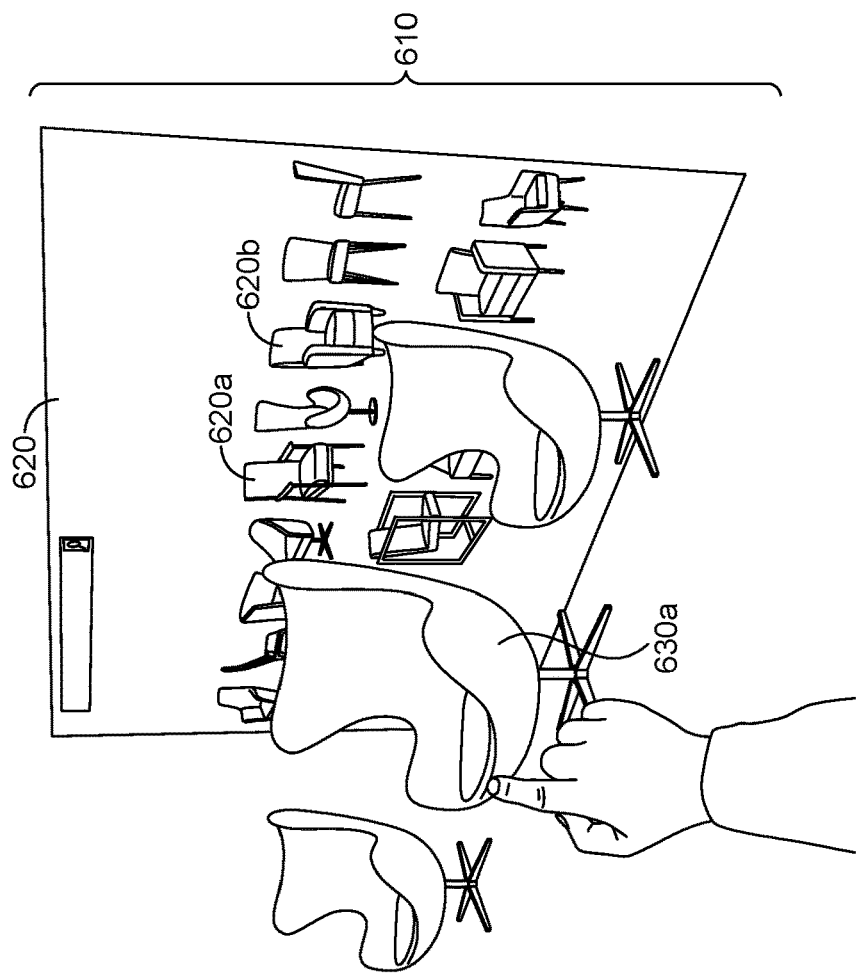
FIG. 6 is an exemplary interface for providing 3-D content with 2-D search results, in accordance with an aspect of the technology described herein.
Figure 6:
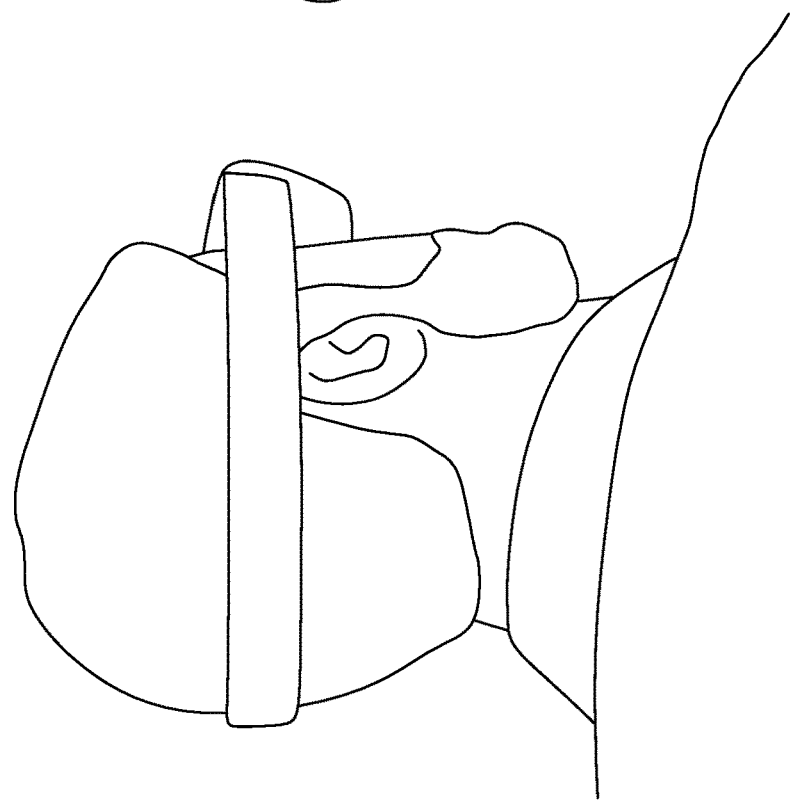

FIG. 6 is another exemplary interface illustrating another user interaction with the updated 2-D search results 520 shown in FIG. 5. FIG. 6 includes a results area 610. The results area 610 includes a 3-D representation 630a. The 3-D representation 630a may be the same or different than those shown in FIG. 5, prior to the interaction with the updated 2-D search results 520. This provides for continuous updating of one or both of the 2-D search results and/or the 3-D representation(s). Here, the user has interacted with the updated 2-D search results 520 of FIG. 5 to see the updated 2-D search results 620 providing one or more images shown as image 620a and image 620b.

Figure 7:
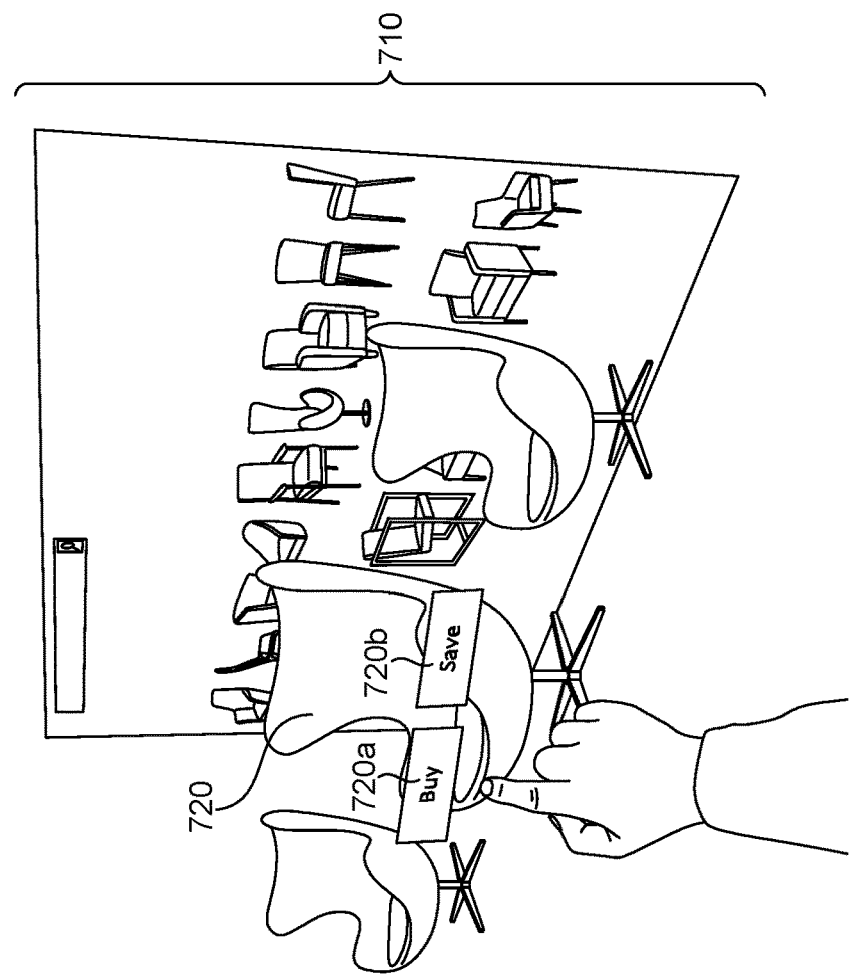
FIG. 7 is an exemplary interface for providing 3-D content with 2-D search results, in accordance with an aspect of the technology described herein.
Figure 7:
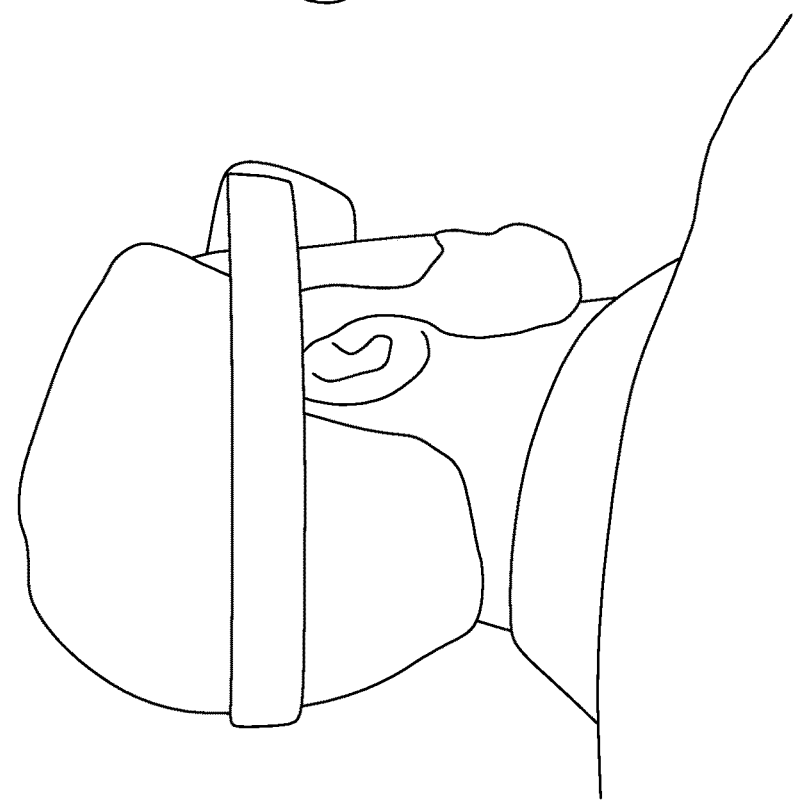

In embodiments, the search platform 106 and/or the 3-D rendering service 105 may identify a moment in time for the user (e.g., purchase mode). Customizations corresponding to the moment in time may be provided within one or more of the 2-D search results and/or the 3-D representation(s). As shown in FIG. 7, the interface 710 includes a one or more 3-D representation(s) 720. The 3-D representation 720 is shown here to include a 'buy' link 720a and a 'save' link 720b. This allows a user to immediately buy a product corresponding to the 3-D representation 720 or save it for future evaluation. In embodiments, the save feature may prompt the associated item to be added to a user's shopping cart/list.

Figure 8:
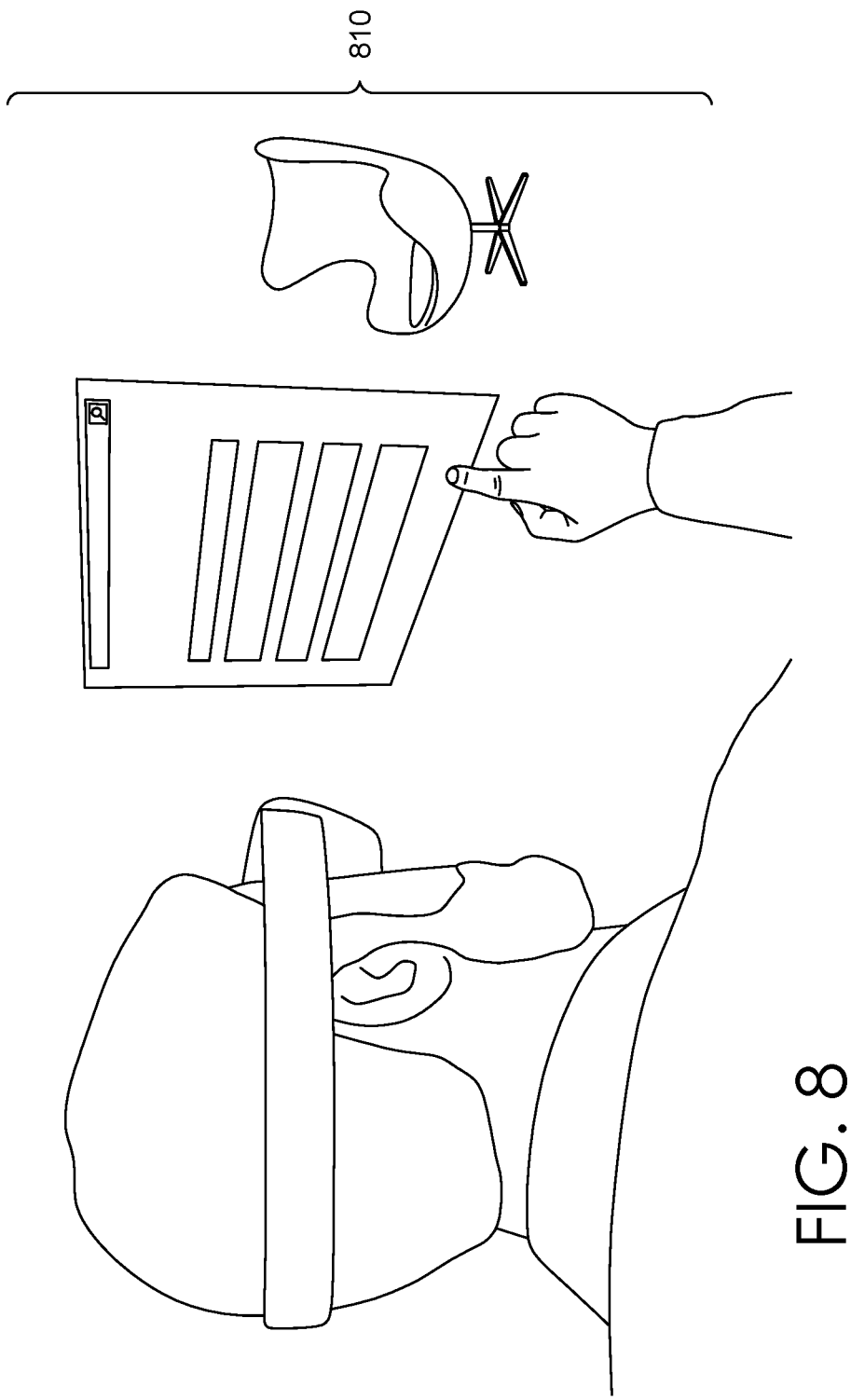
FIG. 8 is an exemplary interface for providing 3-D content with 2-D search results, in accordance with an aspect of the technology described herein.

FIG. 8 provides an exemplary interface 810 providing a different view of the 2-D search results and the 3-D representation(s). Thus far, the 2-D search results and the 3-D representation(s) have been shown according to which item is being interacted with. For instance, the items interacted with are closer to the user than others or overlapping the other items. FIG. 8 illustrates a view where the 2-D search results and the 3-D representation(s) are side-by-side (e.g., a split screen) so that a user can see both equally and determine which to interact with. This may be the view initially provided upon issuance of a search query. Additionally, a user can reset to this view at any time via a reset indication received by the 3-D rendering service 105.

An additional embodiment provides for the 3-D representation(s) and/or the 2-D search results to be interacted with by more than one user. For example, imagine a scenario where multiple people are meeting regarding design plans for a park. A search may be performed by a first user regarding the most sustainable, economic material options for slides. 2-D search results regarding the materials and one or more 3-D representations of slide made of the respective materials may be provided to the first user and any other users joining the meeting (and equipped with a virtual reality headset). The first user is able to interact with the one or more 3-D representations and a second user, either in the same location or a different location (e.g., a different country) as the first user, can also interact with the same one or more 3-D representations and/or 2-D search results. For example, a first user in the U.S. and a second user in Spain can walk around the same model/search results information in the same virtual environment.

Figure 9:
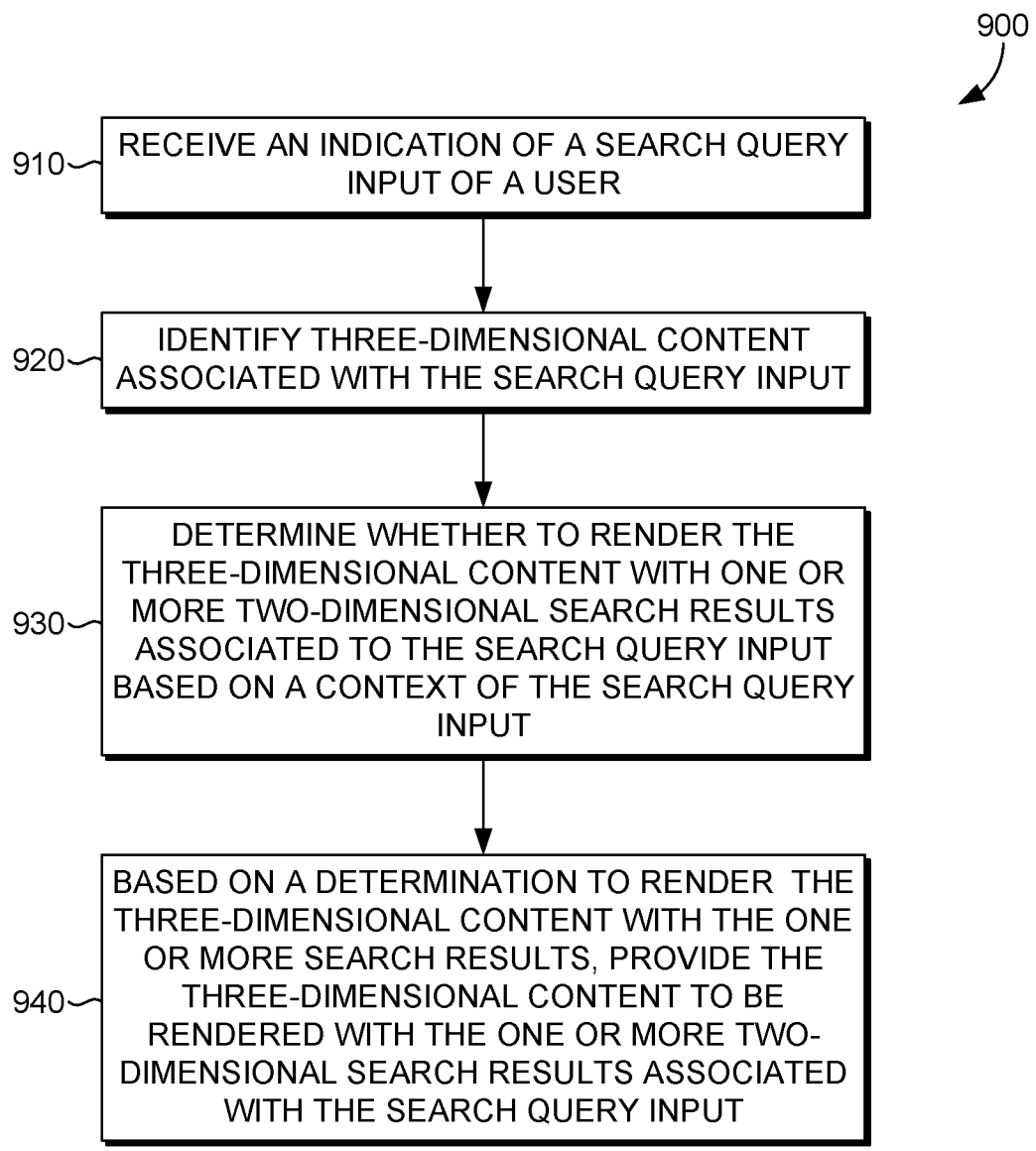
FIG. 9 is a flow diagram depicting a method for providing 3-D content, in accordance with an aspect of the technology described herein.

FIG. 9 is a flow diagram depicting a method 900 for providing 3-D content within search, in accordance with an aspect of the technology described herein. Initially, at block 910, an indication of a search query input of a user is received. The search query input may be input into a search engine. At block 920, three-dimensional content associated with the search query input is identified. This may be accomplished by reviewing three-dimensional content-to-query mappings. At block 930, a determination is made whether to render the three-dimensional content with one or more two-dimensional search results associated to the search query input based on a context of the search query input. At block 940, the three-dimensional content to be rendered with the one or more two-dimensional search results associated with the search query input is provided based on a determination to render the three-dimensional content with the one or more search results.

Figure 10:
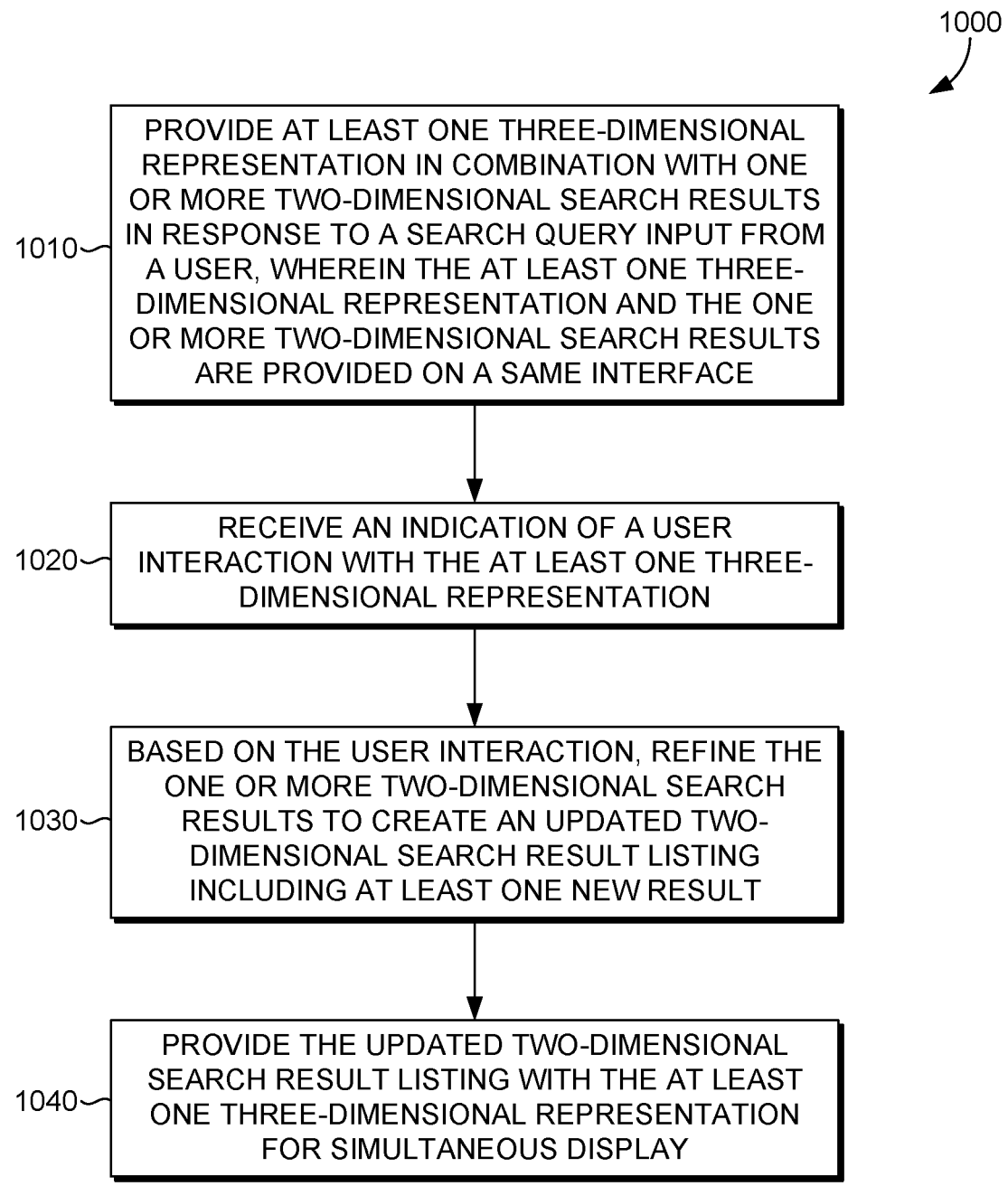
FIG. 10 is a flow diagram depicting another method for providing 3-D content, in accordance with an aspect of the technology described herein.

FIG. 10 is a flow diagram depicting another method 1000 for providing 3-D content within search, in accordance with an aspect of the technology described herein. At block 1010, at least one three-dimensional representation is provided in combination with one or more two-dimensional search results in response to a search query input from a user. The at least one three-dimensional representation and the one or more two-dimensional search results are provided on a same interface. At block 1020, an indication of a user interaction with the at least one three-dimensional representation is received. At block 1030, the one or more two-dimensional search results is refined to create an updated two-dimensional search result listing including at least one new result based on the user interaction. At block 1040, the updated two-dimensional search result listing is provided with the at least one three-dimensional representation for simultaneous display.

Exemplary Operating Environment

Figure 11:
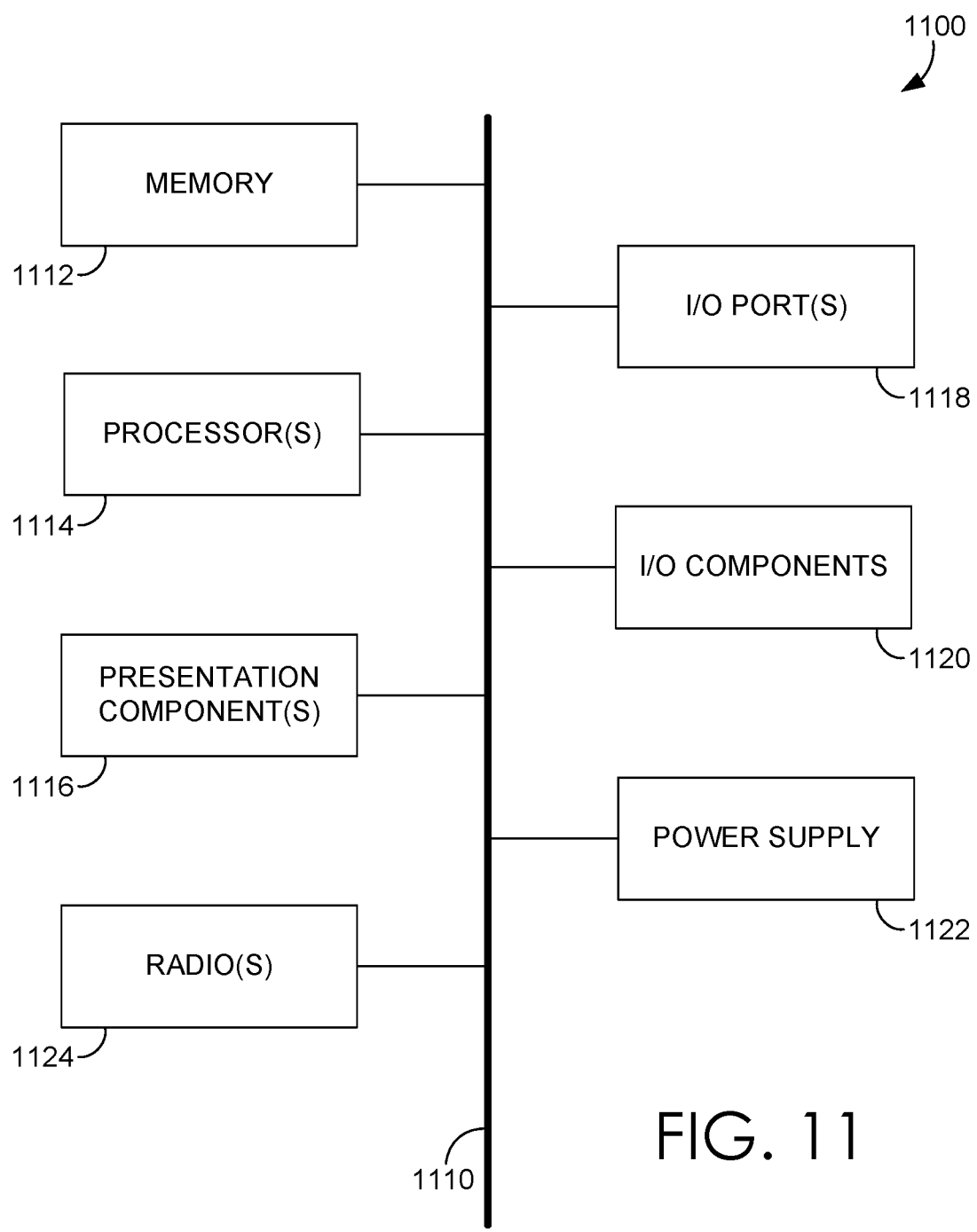
FIG. 11 is a block diagram of an exemplary computing environment suitable for implementing aspects of the technology described herein.

Referring to FIG. 11, an exemplary operating environment for implementing aspects of the technology described herein is shown and designated generally as computing device 1100. Computing device 1100 is just one example of a suitable computing environment and is not intended to suggest any limitation as to the scope of use of the technology described herein. Neither should the computing device 1100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as an address bus, data bus, or a combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 11 and refer to "computer" or "computing device." The computing device 1100 may be a PC, a tablet, a smartphone, virtual reality headwear, augmented reality headwear, a game console, and such.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile and/or nonvolatile memory. The memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112, or I/O components 1120. Presentation component(s) 1116 present data indications to a user or other device. Exemplary presentation components 1116 include a display device, speaker, printing component, vibrating component, etc. I/O ports 1118 allow computing device 1100 to be logically coupled to other devices, including I/O components 1120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1114 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The computing device 1100 may include a radio 1124. The radio transmits and receives radio communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS

Embodiment 1

A method of providing three-dimensional content within search, the method comprising: receiving an indication of a search query input of a user; identifying three-dimensional content associated with the search query input; determining whether to render the three-dimensional content with one or more two-dimensional search results associated with the search query input based on a context of the search query input; and based on a determination to render the three-dimensional content with the one or more search results, providing the three-dimensional content to be rendered with the one or more two-dimensional search results associated with the search query input.

Embodiment 2

The method of Embodiment 1, wherein the three-dimensional content and the one or more two-dimensional search results are provided within a same interface.

Embodiment 3

The method of any of the above Embodiments, wherein context of the search query input is based on one or more previous search queries of a plurality of users.

Embodiment 4

The method of any of the above Embodiments, wherein context of the search query input is based on one or more previous search queries of the user.

Embodiment 5

The method of any of the above Embodiments, wherein context of the search query input is based on one or more of social media data for the user or a user profile of the user.

Embodiment 6

The method of any of the above Embodiments, wherein the three-dimensional content and the one or more two-dimensional search results are provided to a virtual reality headset for display.

Embodiment 7

The method of any of the above Embodiments, further comprising receiving one or more interaction indications from the user indicating an interaction with the three-dimensional content by the user.

Embodiment 8

A computing system comprising: one or more processors; and computer storage memory having computer-executable instructions embodied thereon that, when executed by the one or more processors, implement a method for providing three-dimensional content within search, the method comprising: providing at least one three-dimensional representation in combination with one or more two-dimensional search results in response to a search query input from a user, wherein the at least one three-dimensional representation and the one or more two-dimensional search results are provided on a same interface; receiving an indication of a user interaction with the at least one three-dimensional representation; based on the user interaction, refining the one or more two-dimensional search results to create an updated two-dimensional search result listing including at least one new result; and providing the updated two-dimensional search result listing with the at least one three-dimensional representation for simultaneous display.

Embodiment 9

The system of Embodiment 8, wherein the one or more two-dimensional search results and the updated two-dimensional search result listing are text-based results.

Embodiment 10

The system of Embodiment 8 or 9, wherein the user interaction is a gaze directed to at least a portion of the at least one three-dimensional representation.

Embodiment 11

The system of Embodiment 8, 9, or 10, wherein the user interaction is a natural user interface (NUI) process.

Embodiment 12

The system of Embodiment 8, 9, 10, or 11, wherein the method further comprises: receiving an indication of a text user interaction directed to a first word of a first result of the updated two-dimensional search result listing; providing a first three-dimensional representation associated with the first word; and removing the first three-dimensional representation upon identifying that the user is no longer interacting with the first word.

Embodiment 13

One or more computer storage hardware devices having computer-executable instructions embodied thereon, that when executed, facilitate a method of providing three-dimensional content within search, the method comprising: providing at least one three-dimensional representation in combination with one or more two-dimensional search results in response to a search query input from a user, wherein the at least one three-dimensional representation and the one or more two-dimensional search results are provided on a same interface; receiving an indication of a user interaction with the at least one three-dimensional representation; based on the user interaction, refining the one or more two-dimensional search results to create an updated two-dimensional search result listing including at least one new result; and providing the updated two-dimensional search result listing with the at least one three-dimensional representation for simultaneous display.

Embodiment 14

The one or more computer storage hardware devices of Embodiment 13, wherein the at least one three-dimensional representation and either the one or more two-dimensional search results or the updated two-dimensional search result listing are provided on the same interface of a virtual reality headset.

Embodiment 15

The one or more computer storage hardware devices of Embodiments 13 or 14, wherein the user interaction is a natural user interface (NUI) process.

Embodiment 16

The one or more computer storage hardware devices of Embodiments 13, 14, or 15, wherein the NUI is a gesture directed to the at least one three-dimensional representation.

Embodiment 17

The one or more computer storage hardware devices of Embodiments 13, 14, 15, or 16 wherein the method further comprises updating the at least one three-dimensional representation based on the user interaction.

Embodiment 18

The one or more computer storage hardware devices of Embodiments 13, 14, 15, 16, or 17, wherein the updating including providing a link within the three-dimensional representation.

Embodiment 19

The one or more computer storage hardware devices of Embodiments 13, 14, 15, 16, 17, or 18, wherein the user interaction is a gaze directed to at least a portion of the at least one three-dimensional representation.

Embodiment 20

The one or more computer storage hardware devices of Embodiments 13, 14, 15, 16, 17, 18, or 19, wherein the gaze is monitored utilizing eye tracking technology.

Aspects of the technology have been described to be illustrative rather than restrictive. It will be understood that certain features and subcombinations are of utility and may be employed without reference to other features and subcombinations. This is contemplated by and is within the scope of the claims.

The technology claimed is:

1. A method of providing three-dimensional content within search, the method comprising:
   receiving an indication of a search query input of a user;
   identifying three-dimensional content associated with the search query input;
   determining whether to render three-dimensional content with one or more two-dimensional search results associated with the search query input based on a context of the search query input;
   based on a determination to render the three-dimensional content with the one or more two-dimensional search results, providing the three-dimensional content with the one or more two-dimensional search results associated with the search query input;
   receiving an indication of a first user interaction with at least a portion of the three-dimensional content;
   upon receiving the indication of the first user interaction, providing the three-dimensional content in a prominent position and the one or more two-dimensional search results in a non-prominent position;
   determining that the first user interaction with the at least a portion of the three-dimensional content is greater than a predetermined period of time;
   based on the determination that the first user interaction with the at least a portion of the three-dimensional content is greater than the predetermined period of time, updating the search query input to generate an updated search query input;
   updating the one or more two-dimensional search results to generate an updated one or more two-dimensional search result listing including updated one or more two-dimensional search results based on the updated search query input, wherein the three-dimensional content remains displayed during updating of the one or more two-dimensional search results;
   receiving an indication of a second user interaction with at least a portion of the updated one or more two-dimensional search results;
   upon receiving the indication of the second user interaction with the at least a portion of the updated one or more two-dimensional search results, providing the updated one or more two-dimensional search results in the prominent position and relocating the three-dimensional content to the non-prominent position; and
   upon receiving the indication of the second user interaction with the at least a portion of the updated one or more two-dimensional search results, updating the three-dimensional content to provide updated three-dimensional content associated with the at least a portion of the updated one or more two-dimensional search results.

2. The method of claim 1, wherein the three-dimensional content and the one or more two-dimensional search results are provided within a same interface.

3. The method of claim 1, wherein context of the search query input is based on one or more previous search queries of a plurality of users.

4. The method of claim 1, wherein context of the search query input is based on one or more previous search queries of the user.

5. The method of claim 1, wherein context of the search query input is based on one or more of social media data for the user or a user profile of the user.

6. The method of claim 1, wherein the three-dimensional content and the one or more two-dimensional search results are provided to a virtual reality headset for display.

7. The method of claim 1, further comprising receiving additional indications from the user indicating additional interactions with the three-dimensional content by the user.

8. A computing system comprising:
   one or more processors; and
   computer storage memory having computer-executable instructions embodied thereon that, when executed by the one or more processors, implement a method for providing three-dimensional content within search, the method comprising:
   providing at least one three-dimensional representation in combination with one or more two-dimensional search results in response to a search query input from a user, wherein the at least one three-dimensional representation and the one or more two-dimensional search results are provided on a same interface;
   receiving a first indication of a first user interaction with the at least one three-dimensional representation;
   upon receiving the first indication of a first user interaction, providing the at least one three-dimensional representation in a prominent position and the one or more two-dimensional search results in a non-prominent position:
   based on the first user interaction, refining the oneor more two-dimensional search results to create an updated two-dimensional search result listing including at least one new result;
   providing the updated two-dimensional search result listing with the at least one three-dimensional representation for simultaneous display;
   receiving a second indication of a second user interaction with at least a portion of the updated two-dimensional search result listing;
   upon receiving the second indication of the second user interaction with the at least a portion of the updated two-dimensional search result listing, providing the updated two-dimensional search result listing in a prominent position and relocating the at least one three-dimensional representation to the non-prominent position; and
   based on the second user interaction with the at least a portion of the updated two-dimensional search result listing, updating the three-dimensional representation to provide an updated three-dimensional representation associated with the at least a portion of the updated two-dimensional search result listing.

9. The system of claim 8, wherein the one or more two-dimensional search results and the updated two-dimensional search result listing are text-based results.

10. The system of claim 8, wherein the first user interaction is a gaze directed to at least a portion of the at least one three-dimensional representation.

11. The system of claim 8, wherein the first user interaction is a natural user interface (NUI) process.

12. The system of claim 8, wherein the method further comprises:
 receiving an additional indication of a text user interaction directed to a first word of a first result of the updated two-dimensional search result listing;
 providing a first three-dimensional representation associated with the first word; and
 removing the first three-dimensional representation upon identifying that the user is no longer interacting with the first word.

13. One or more computer storage media having computer-executable instructions embodied thereon, that when executed, facilitate a method of providing three-dimensional content within search, the method comprising:
 providing at least one three-dimensional representation in combination with one or more two-dimensional search results in response to a search query input from a user, wherein the at least one three-dimensional representation and the one or more two-dimensional search results are provided on a same interface;
 receiving an indication of a first user interaction with the at least one three-dimensional representation;
 upon receiving the indication of the first user interaction with the at least one three-dimensional representation. providing the at least one three-dimensional representation in a prominent position and the one or more two-dimensional search results in a non-prominent position;
 based on the first user interaction, refining the oneor more two-dimensional search results to create an updated two-dimensional search result listing including at least one new result,
 providing the updated two-dimensional search result listing with the at least one three-dimensional representation for simultaneous display;
 receiving an indication of a second user interaction with at least a portion of the updated two-dimensional search result listing;
 upon receiving the indication of the second user interaction with the at least a portion of the updated two-dimensional search result listing, providing the updated two-dimensional search result listing in a prominent position and relocating the at least one three-dimensional representation to the non-prominent position; and
 based on the second user interaction, updating the at least one three-dimensional representation to provide an updated three-dimensional representation associated with the at least a portion of the updated two-dimensional search result listing.

14. The one or more computer storage media of claim 13, wherein the at least one three-dimensional representation and either the one or more two-dimensional search results or the updated two-dimensional search result listing are provided on the same interface of a virtual reality headset.

15. The one or more computer storage media of claim 13, wherein the first user interaction is a natural user interface (NUI) process including a gesture directed to the at least one three-dimensional representation.

16. The one or more computer storage media of claim 13, wherein the at least one three-dimensional representation is interacted with by both a first user and a second user with the same virtual reality environment.

17. The one or more computer storage media of claim 13, wherein updating the at least one three-dimensional representation includes providing a link within the updated three-dimensional representation.

18. The one or more computer storage media of claim 13, wherein the first user interaction is a gaze directed to at least a portion of the at least one three-dimensional representation.

19. The one or more computer storage media of claim 18, wherein the gaze is monitored utilizing eye tracking technology.

\* \* \* \* \*